United States Patent
Wunderlich et al.

(10) Patent No.: US 11,761,340 B2
(45) Date of Patent: Sep. 19, 2023

(54) BLADE COMPONENT, METHOD FOR MANUFACTURE OF SAME, AND GAS TURBINE

(71) Applicant: Rolls-Royce Deutschland Ltd & Co KG, Blankenfelde-Mahlow (DE)

(72) Inventors: Thomas Wunderlich, Rangsdorf (DE); Markus Weinert, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/552,825

(22) Filed: Dec. 16, 2021

(65) Prior Publication Data
US 2022/0195875 A1   Jun. 23, 2022

(30) Foreign Application Priority Data
Dec. 17, 2020   (DE) ............... 10 2020 216 193.3

(51) Int. Cl.
*F01D 5/18* (2006.01)
*B23P 15/04* (2006.01)
(Continued)

(52) U.S. Cl.
CPC ............... *F01D 5/189* (2013.01); *B22F 5/04* (2013.01); *B23P 15/04* (2013.01); *F01D 5/147* (2013.01);
(Continued)

(58) Field of Classification Search
CPC .......... F01D 5/188; F01D 5/189; F01D 5/147; B23P 15/04; F05D 2230/21; F05D 2230/22; F05D 2230/23; B22F 5/04; B22F 3/225
See application file for complete search history.

(56) References Cited

U.S. PATENT DOCUMENTS 5,259,730 A * 11/1993 Damlis ............... F01D 5/189
                                                 416/96 A
6,384,365 B1   5/2002 Seth et al.
(Continued)

FOREIGN PATENT DOCUMENTS

DE   102011089260 A1   6/2013
DE   102014226370 A1   6/2016
(Continued)

OTHER PUBLICATIONS

German Search Report dated Aug. 6, 2021 from counterpart German Patent Application No. 10 2020 216 193.3.

*Primary Examiner* — Topaz L. Elliott
*Assistant Examiner* — Michael K. Reitz
(74) *Attorney, Agent, or Firm* — SHUTTLEWORTH & INGERSOLL, PLC; Timothy Klima

(57) ABSTRACT

A blade component of a compressor or turbine stage of a gas turbine, in particular of a gas turbine engine is provided. The blade component has at least two structural elements which can be connected together by means of a connection process, in particular sintering. The at least two structural elements can be coupled and/or connected to at least one means for internal cooling of the blade component, and/or the means for internal cooling of the blade component is arranged in at least one of the least two structural elements. The at least two structural elements, when assembled, can be coupled to a cooling insert inside the blade component, wherein during operation, cooling air flowing into the cooling insert can be guided in targeted fashion via impingement cooling openings onto the inside of the blade component, in particular as impingement flow cooling.

13 Claims, 12 Drawing Sheets

(51) Int. Cl.
  *F01D 5/20* (2006.01)
  *F01D 5/14* (2006.01)
  *B22F 5/04* (2006.01)

(52) U.S. Cl.
  CPC .......... *F01D 5/20* (2013.01); *F05D 2220/323* (2013.01); *F05D 2220/329* (2013.01); *F05D 2260/201* (2013.01)

(56) References Cited

U.S. PATENT DOCUMENTS

| | | |
|---|---|---|
| 2003/0223861 A1 | 12/2003 | Morrison et al. |
| 2006/0251536 A1* | 11/2006 | Kelly .................... B22F 3/1021 419/36 |
| 2008/0237403 A1* | 10/2008 | Kelly ...................... B22F 3/225 244/34 A |
| 2009/0081032 A1 | 3/2009 | Moroso et al. |
| 2009/0119919 A1* | 5/2009 | Kington .................... F01D 5/34 29/889.7 |
| 2009/0255332 A1* | 10/2009 | Bunker .................... G01F 1/68 73/204.11 |
| 2013/0052074 A1 | 2/2013 | Durocher et al. |

FOREIGN PATENT DOCUMENTS

| | | |
|---|---|---|
| DE | 102015216306 A1 | 3/2017 |
| EP | 3848555 A1 * | 7/2021 |

* cited by examiner

BLADE COMPONENT, METHOD FOR MANUFACTURE OF SAME, AND GAS TURBINE

CROSS-REFERENCE TO A RELATED APPLICATION

This application claims priority to German Application No, 10 2020 216 193.3 filed Dec. 17, 2020, which application is incorporated by reference herein.

BACKGROUND

The present disclosure relates to a blade component, a method for manufacturing a blade component, and a gas turbine engine.

Blades in gas turbines, such as for example gas turbine engines, are components of complex form which are extremely complicated to manufacture. Also, in operation, the blades are exposed to particularly high thermal loads, so that the blades often comprise on the inside devices for heat transmission, in particular cooling devices. US 2009/0081032 A1 discloses such a blade of composite structure. US 2013/0052074 A1 describes a gas turbine component which can be manufactured by metal injection molding (MIM).

The object is to provide blade components which can be manufactured efficiently and in particular can be cooled in simple fashion.

According to a first aspect, such a blade component with the features described herein is provided.

The blade component is designed for use in a compressor or turbine stage of a gas turbine, in particular of a gas turbine engine in an aircraft.

The blade component comprises at least two structural elements which can be connected together by means of a connection process, in particular sintering, wherein the at least two structural elements can be coupled and/or connected to at least one means for internal cooling of the blade component. In addition or alternatively, it is possible that the means for internal cooling of the blade component is arranged in at least one of the least two structural elements.

In any case, when assembled, the interior of the blade component contains a means for internal cooling of the blade component during operation.

The at least two structural elements may thus be used to form a blade component, wherein the structural elements touch one another at one or more points the connecting surface. The connecting surface may thus be a closed face or consist of two or more parts, i.e. the structural elements then do not touch over the full surface.

The one face or the several connecting surfaces lie on a spatial face which has a specific orientation. One example of such a face is for example a plane which is arranged perpendicularly to the radial orientation of the blade component, i.e. it intersects the blade component transversely.

In the more general case, the face in which the connecting surface lies is a free-form face, e.g. it is curved, undulating or has different curvatures in many regions.

Since the form of the face—and hence the spatial arrangement of the connecting surface (one-piece or multipiece)—can be freely selected within broad limits, the blade component may be assembled from structural elements, the forms of which have been optimized for the respective application. One possibility would e.g. be a free-form face similar to a blade geometry (aerofoil).

This allows a cheaper production of the geometric features of the blade components, which is necessary for a high-efficiency cooling system with small component size. This is associated with the possibility of designing and producing smaller features with smaller wall thickness, which leads to a comparatively lighter blade design.

In one embodiment, at least one of the two structural elements has a contour on its inside which, when assembled, forms part of a cooling duct. When assembled, the contour may in particular extend from the at least one structural element into the interior of the blade component. A cooling medium such as e.g. air can flow through the cooling duct. Since blades are exposed to high thermal loads in particular in the high-pressure region of turbines, cooling is of great importance here. The shape of the cooling duct—and hence also the effect of the cooling—may be structured within broad limits thanks to the possible flexibility in the design of the structural elements.

The at least two structural elements, when assembled, can be coupled to a cooling insert inside the blade component, wherein during operation, cooling air flowing into the cooling insert can be guided in targeted fashion via impingement cooling openings onto the inside of the blade component, in particular as impingement flow cooling. When assembled for example, a cooling duct may be formed between the at least two structural elements and the cooling insert. The structural elements and the cooling insert may here be produced separately and then joined into a blade component.

This specific design with a cooling insert allows adaptation of an impingement cooling system without the need for more complex core design, which is difficult to produce at low cost and with high yield.

Furthermore, the at least two structural elements are connected via a connecting surface, wherein the connecting surface is arranged in a free-form face or in a plane.

The free-form face or the plane may be arranged substantially parallel to the radial extent of the blade component, or the free-form face or plane is arranged substantially perpendicularly to the radial extent.

For particularly efficient manufacture of the blade component, the at least two structural elements and/or the cooling insert may be formed as green parts of a metal injection molding process. These can then be sintered jointly during a next stage of the metal injection molding process.

The at least two structural elements and/or the cooling insert may be made of different materials or comprise different materials. Then a blade component may be assembled, the individual parts of which can be designed suitably for the loads. Thus e.g. in regions with particularly high thermal load, a different material may be used than for regions in which the load is not as high. Thus e.g. the structural element comprising the stagnation point of the blade component may be constructed from a different metallic material from the component comprising the trailing edge of the blade component. It is also possible to provide a division in the radial direction which depends on the mechanical loading.

Also, one of the at least two structural elements may comprise the suction side or the pressure side of the blade component. This substantially gives a division of the blade component with a connecting surface extending in the radial direction.

Alternatively, it is possible that one of the at least two structural elements comprises the tip of the blade component or the base of the blade component. This substantially gives a division of the blade component with a connecting surface extending perpendicularly to the radial direction.

In a further embodiment, the blade component may be connected to a ring component or a disc component, in particular by sintering into a compressor or turbine stage.

Also, a connecting means to a ring component or a disc component may be arranged on at least one of the structural elements. The connecting means may e.g. be configured for form fit as a dovetail connection or as a fir tree connection.

The object is also achieved by a method having the features described herein.

In particular, the at least two structural elements may be connected, in particular sintered, to a cooling insert and/or a ring component or a disc component.

Furthermore, the object is achieved by a gas turbine having the features described herein. It may be designed as a stationary gas turbine, as a gas turbine for a ship, or as a gas turbine engine for an aircraft.

BRIEF DESCRIPTION OF THE DRAWINGS

Embodiments are presented below as examples with reference to the drawing.

The drawings show.

DETAILED DESCRIPTION

Figure 1:
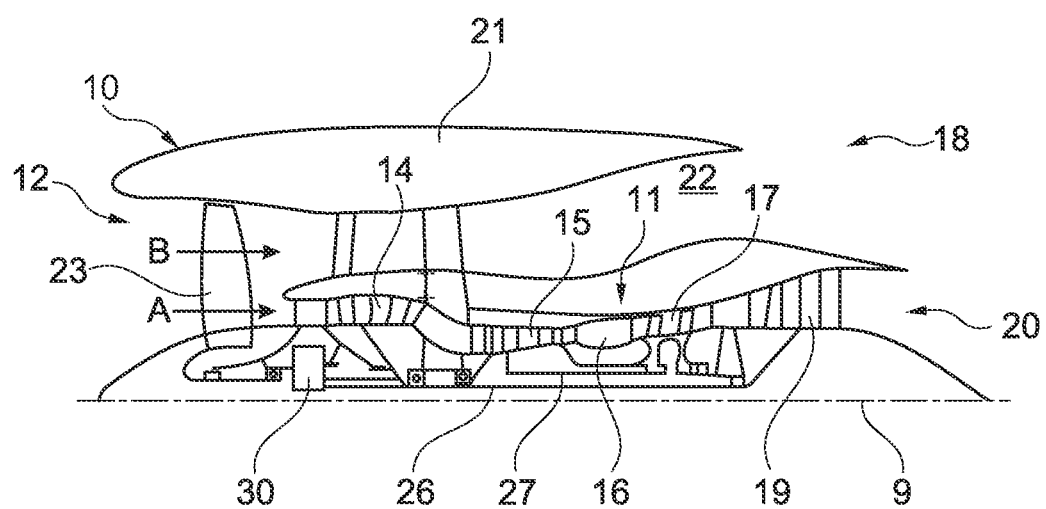
FIG. 1 a sectional side view of a gas turbine engine.

FIG. 1 illustrates a gas turbine engine 10 having a main axis of rotation 9. The engine 10 comprises an air intake 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the propulsive thrust. The epicyclic planetary gear box 30 is a reduction gear box.

The low-pressure turbine 19 (see FIG. 1) drives the shaft 26, which is coupled to a sun gear 28 of the epicyclic planetary gear box 30. Multiple planet gears, which are coupled to one another by a planet carrier, are situated radially to the outside of the sun gear and mesh therewith. The planet carrier guides the planet gears in such a way that they circulate synchronously around the sun gear, whilst enabling each planet gear to rotate about its own axis. The planet carrier is coupled via linkages to the fan 23 in order to drive its rotation about the engine axis 9. Radially to the outside of the planet gears and intermeshing therewith is an external gear or ring gear that is coupled via linkages to a stationary supporting structure 24.

It is noted that the terms "low-pressure turbine" and "low-pressure compressor" as used herein may be taken to mean the lowest-pressure turbine stage and lowest-pressure compressor stage (i.e. not including the fan 23) respectively, and/or the turbine and compressor stages that are connected together by the connecting shaft 26 with the lowest rotational speed in the engine (i.e. not including the gearbox output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

The compressors 14, 15 and the turbine 17, 19 in the embodiment depicted each have at least one stage in which the blades serve to convert flow energy into a rotational movement.

Embodiments of blade components 50 are described below for manufacturing of the blades which, after the end of production, may be used in this way in an axial compressor or axial turbine.

Here, blade components 50 are described which can be used in particular in gas turbine engines 10 for aircraft. Use of the blade components 50 is not however restricted to this application. Gas turbines with blades produced accordingly in the turbine and/or compressor stages may also be used in other vehicles or in ships. Also, such blades may be used in stationary gas turbines, e.g. in energy conversion.

Figure 2:
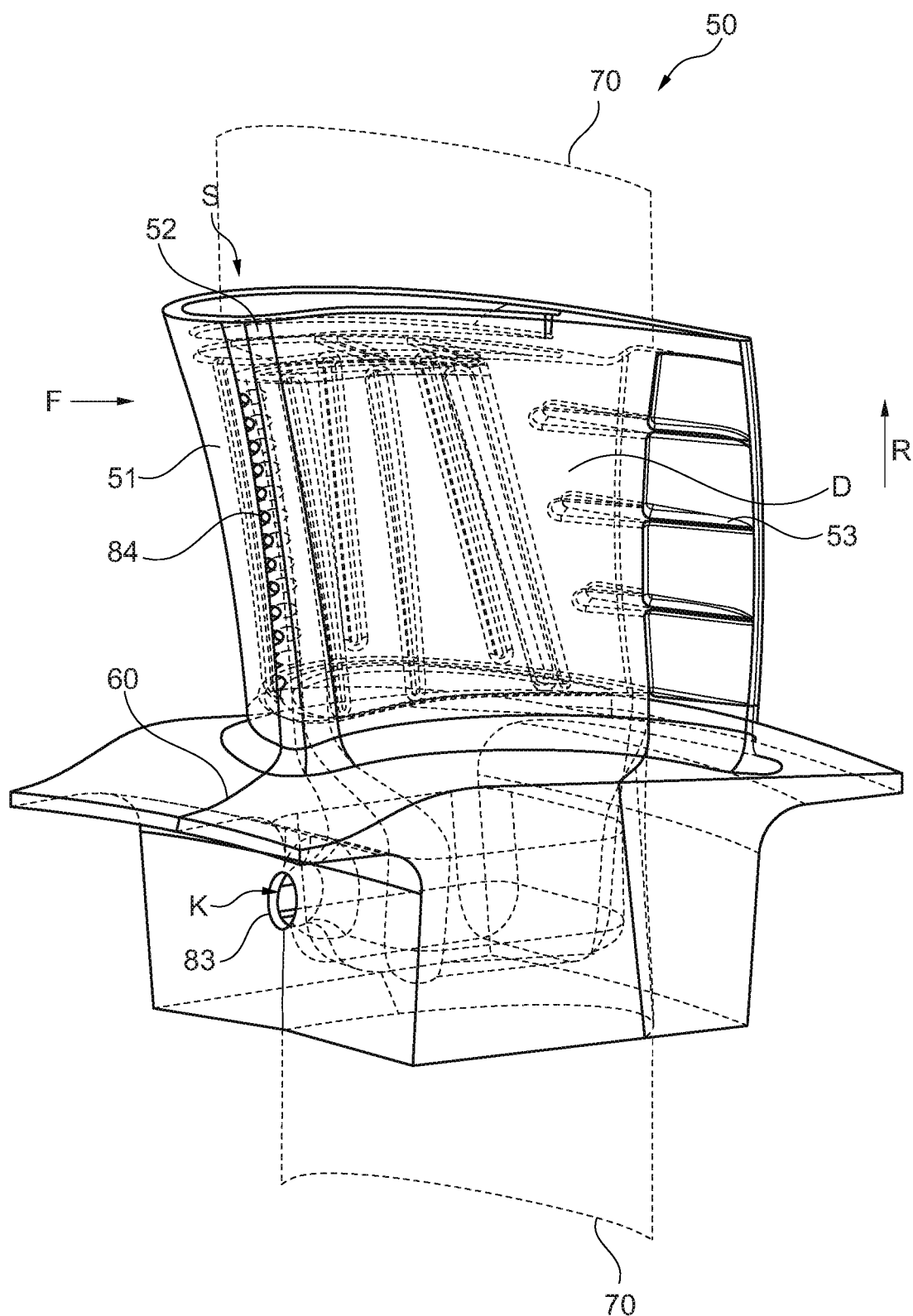
FIG. 2 a perspective view of an embodiment of a blade component assembled from two structural elements.

FIG. 2 shows a perspective view of an embodiment of a blade component 50 which is composed of two structural elements 51, 52. The individual structural elements 51, 52 are shown in FIGS. 3 and 4.

When such a blade component 50 is in operation, it is exposed to a flow from the contact flow direction F. The suction side S is on the side facing away from the illustration in FIG. 2, and the pressure side D is on the other side. In general, the blade component 50 extends upward in the radial direction R from the base.

Figure 3:
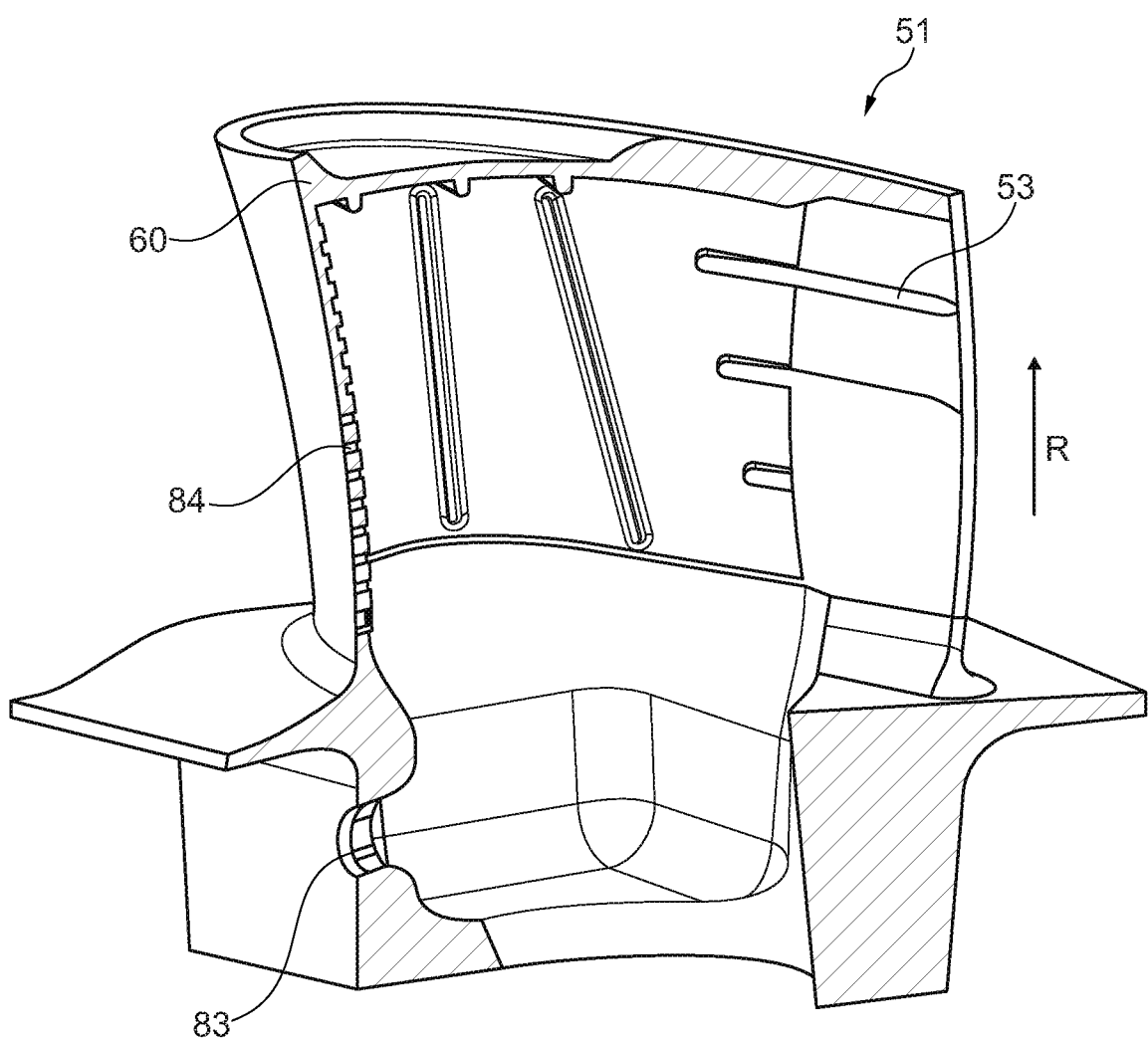
FIG. 3 a perspective view of a first structural element (suction side) of the embodiment from FIG. 2.
Figure 4:
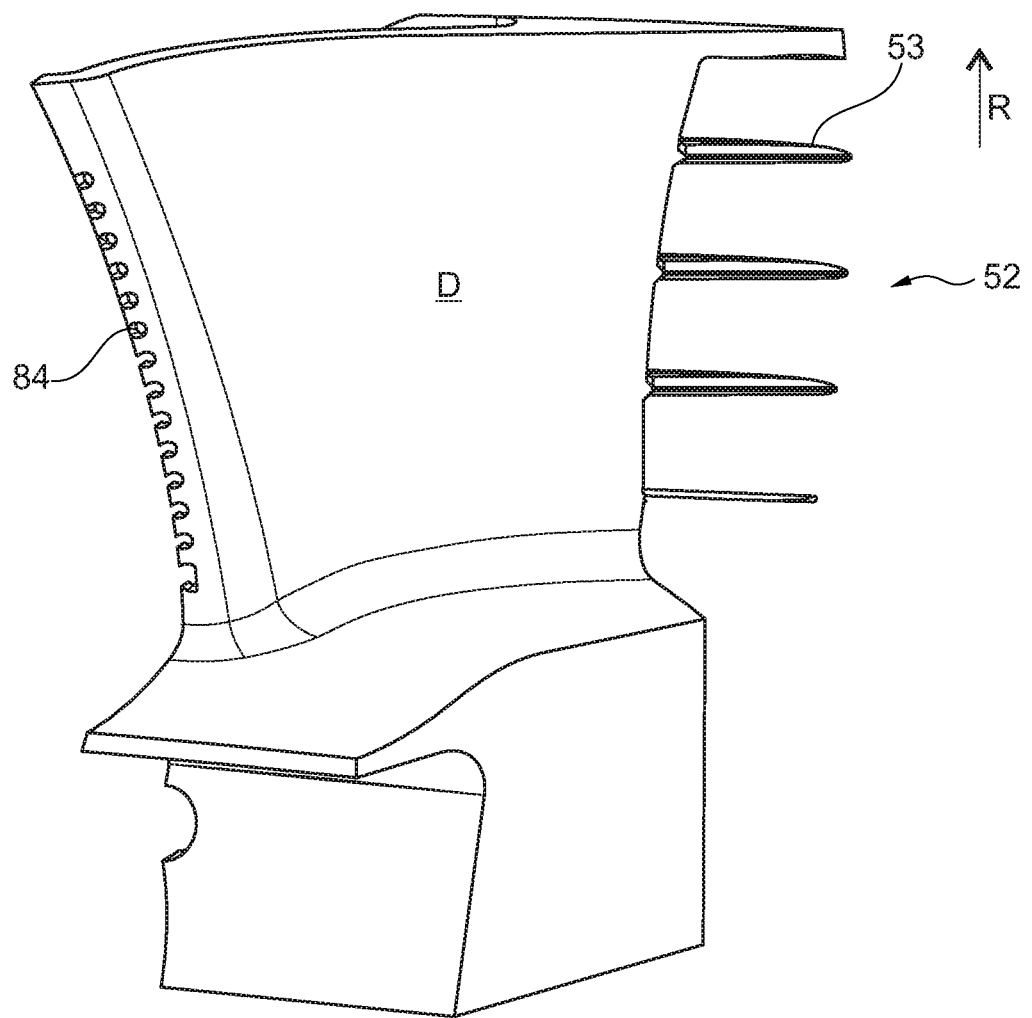
FIG. 4 a perspective view of a second structural element (pressure side) of the embodiment from FIG. 2.

The two structural elements 51, 52, which are described in more detail in FIGS. 3 and 4, are connected together via a connecting surface 60, wherein only the joining line at the leading edge is evident in the illustration of FIG. 2. The connecting surface 60 is here a bent face 70 which approximately follows the middle line of the cross-section of the blade component 50. The face 70 is here indicated schematically, extending beyond the blade component 50.

The connecting surface 60 here connects the first structural element 51 which comprises the suction side S, and the second structural element 51 which comprises the pressure side D. Since the two sides S, D are exposed to different loads in operation, the two parts may e.g. be made of different materials adapted to the load, or also have a specific structural design for the respective application.

If the blades are manufactured in a metal injection molding process, the two structural elements 51, 52 are formed as green parts which can touch at a connecting surface 60, i.e. the connecting surface 60 lies in the interior of the assembled blade component 50.

Figure 11:
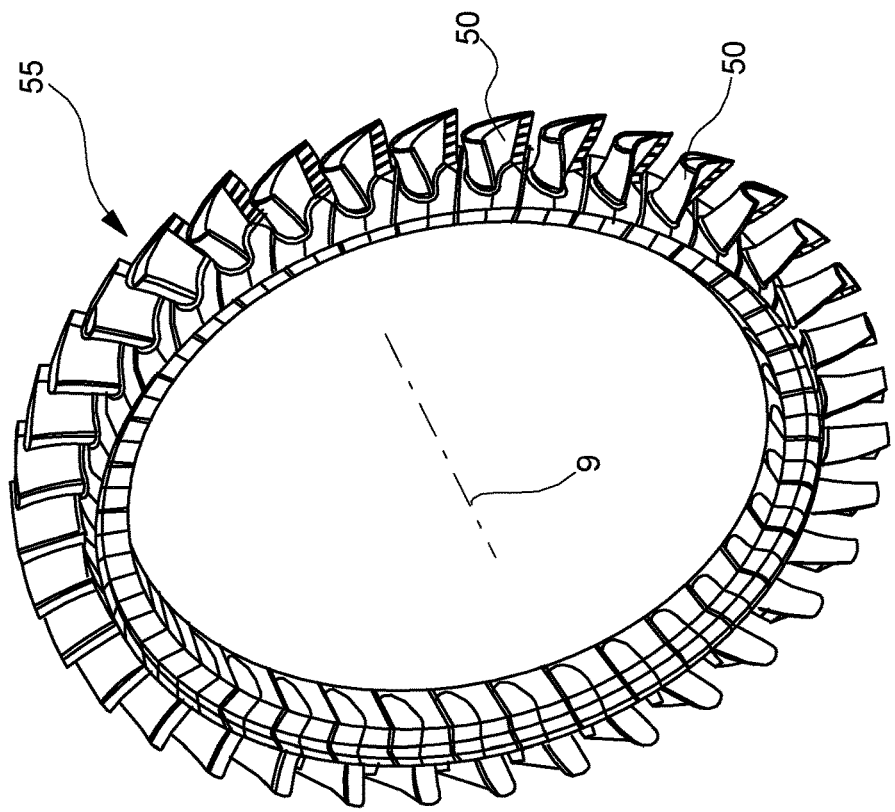
FIG. 11 an illustration of a ring component formed from blade components.

Such a blade component 50 may in principle be part of a compressor or turbine stage of the gas turbine. A connecting means to a ring component 55 or disc component (see e.g. FIG. 11 or 12) may be arranged on the base of at least one of the two structural elements 51, 52, e.g. in the form of a dovetail connection or a fir tree connection (not shown here). This connecting means may already be moulded onto the green part or the connecting means is produced by a subsequent machining process (e.g. milling, spark erosion) on the structural elements 51, 52.

The face 70 in which the connecting surface 60 between the structural elements 51, 52 lies is here a curved face, wherein the curvature is (but need not be) substantially constant in the radial direction R.

In other embodiments, the face 70 in which the connecting surface 60 (or its parts) lies may be more complex. Thus the face 70 may extend as a free-form spatial face, wherein this may at one point have two curvatures in different spatial directions, so that the blade component 50 may be formed from structural elements 51, 52 with highly complex form.

A blade component 50 assembled accordingly from green parts 51, 52 is connected by means of a connecting process, here sintering, as part of a metal injection molding process.

Figure 6:
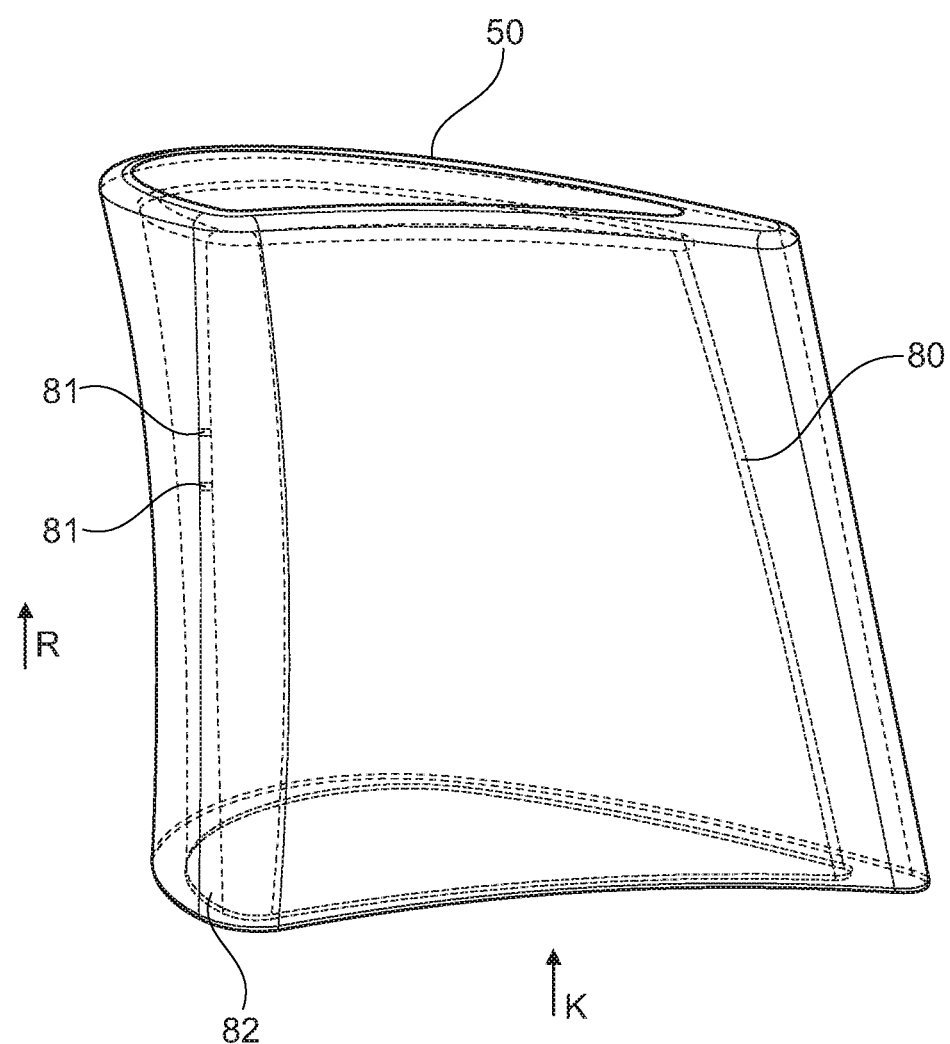
FIG. 6 a perspective view of a blade component with cooling insert integrated therein.

The two structural elements 51, 52 may be able to be coupled or connected to a means 80 for internal cooling of the blade component, as described in connection with FIG. 6.

In FIG. 2, an inlet opening 83 for a cooling medium, e.g. cooling air K, is arranged in the base of the blade component 50. After flowing through the interior of the blade component 50, the heated cooling air K emerges again from outlet openings 84. The outlet openings 84 lie on the connecting surface 60, so that one part of the outlet openings 84 is arranged in the first structural element 51 and the other part in the second structural element 52. The parts of the outlet openings 84 may here already be created during production of the green parts, so that the complete outlet openings 84 result after connection (sintering) of the two structural elements 51, 52. In this way, outlet openings 84 need not be made subsequently, e.g. by drilling.

Furthermore, FIG. 2 shows contours 53 in the inside of the blade component 50 which protrude in the form of walls from the inside of a structural element 51 and extend into the interior. These constitute cooling ribs which serve for better heat transfer.

The embodiment shown here has two structural elements 51, 52. In principle, it is also possible to use more than two structural elements 51, 52 to form a blade component 50. Thus structural elements 51, 52 with particularly complex form may be produced in different processes, before then being connected together by sintering. It is also possible that the face 70 is tilted relative to the radial extent R.

FIG. 3 shows a perspective view of the first structural element 51 which comprises the suction side S (here on the side facing away) of the blade component 50. The contours 53 for improved heat transmission can be seen on the inside of the structural element 51. The inside here means the side which points towards the interior when the blade component 50 is assembled.

The connecting surface 60, which lies in the face 70 (not shown here), is also evident in the illustration.

FIG. 4 shows the second structural element 52 which is complementary to the first structural element 51. This second structural element 52 comprises the pressure side D of the blade component 50.

Figure 5:
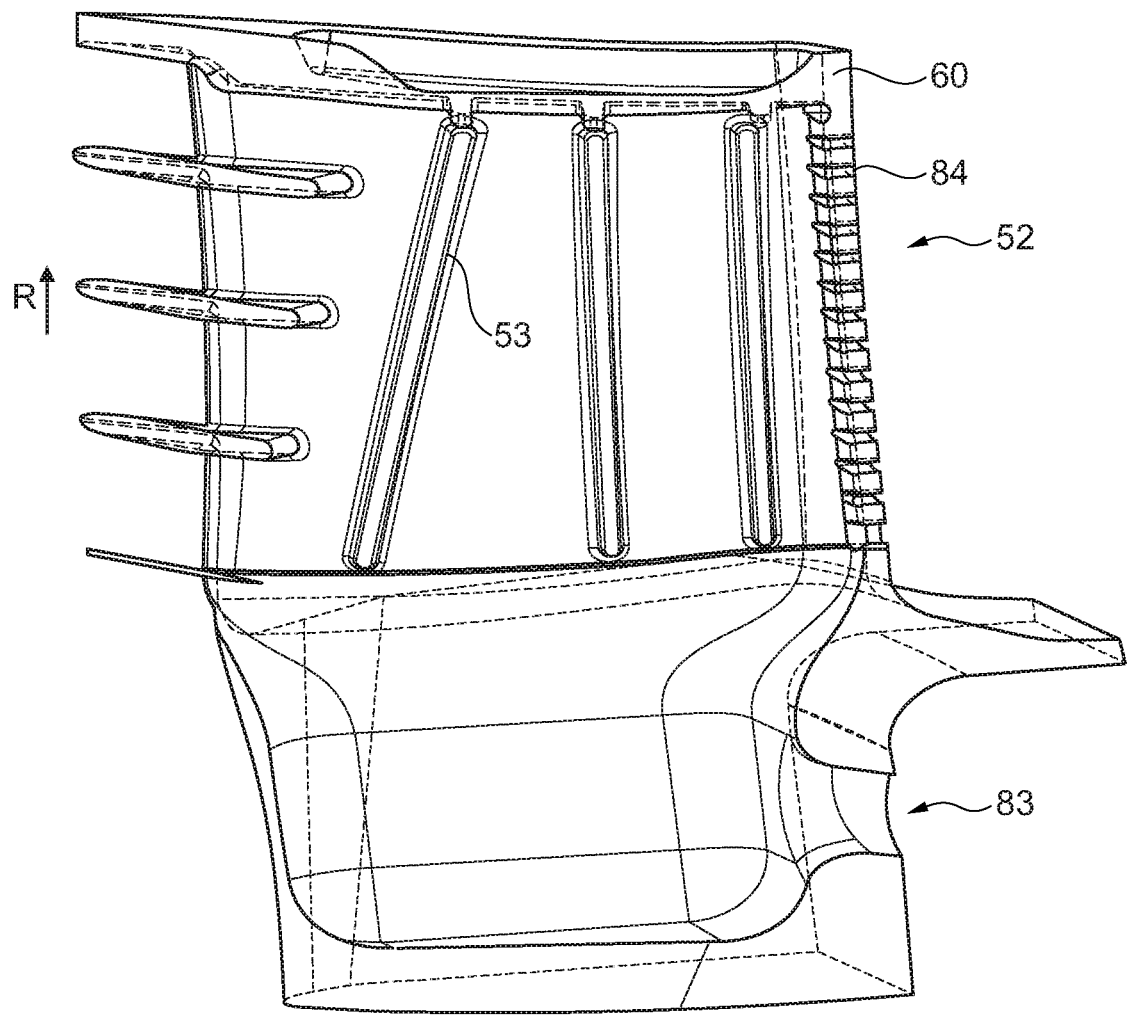
FIG. 5 a view of the inside of the second structural element.

The inside of the second structural element 52 is shown in FIG. 5, wherein here the connecting surface 60 can be seen via which the connection to the first structural element 51 can be created.

The two structural elements 51, 52 may here be coupled to a means 80 for internal cooling of the blade component, here a cooling insert 80, which is arranged in the interior of the blade component when the two structural elements 51, 52 are assembled. An embodiment of the cooling insert 80 is shown in FIG. 6, wherein the form of the blade component 50 is visible on the outside.

The cooling insert 80 has an opening at its lower end to allow the inlet of cooling air K. As soon as the cooling air K has reached the inner chamber of the cooling insert 80, it is driven through individual spaced impingement cooling openings 81 (here depicted schematically), which are produced during manufacture of the cooling insert 80 or by machining processes. The cooling air K then meets the inside of the blade component 50 in the form of an impingement air cooling, whereby a good heat transfer from the material to the cooling air K is achieved during operation. The intermediate space between the inside of the structural elements 51, 52 and the cooling insert forms a cooling duct 82.

Then the cooling air emerges again through the outlet openings 84 (see FIG. 2) and in some cases through additional cooling bores. The cooling insert 80 is also formed as a green part, so that during sintering to the structural elements 51, 52, it becomes a structural part of the blade component 50.

FIGS. 2 to 5 show an embodiment in which the face 70, in which the connecting surface 60 lies, is arranged substantially in the direction of the radial extent R. The structural elements 51, 52 may here be coupled to the cooling insert 80.

FIGS. 7 to 10 show a further embodiment of a blade component 50 in which the structural elements 51, 52 are assembled in a different position. The connecting surface 60 is here arranged substantially perpendicularly to the radial extent R. In principle, the description of the first embodiment according to FIGS. 2 to 5 is also applicable here, so reference may be made to this.

Figure 8:
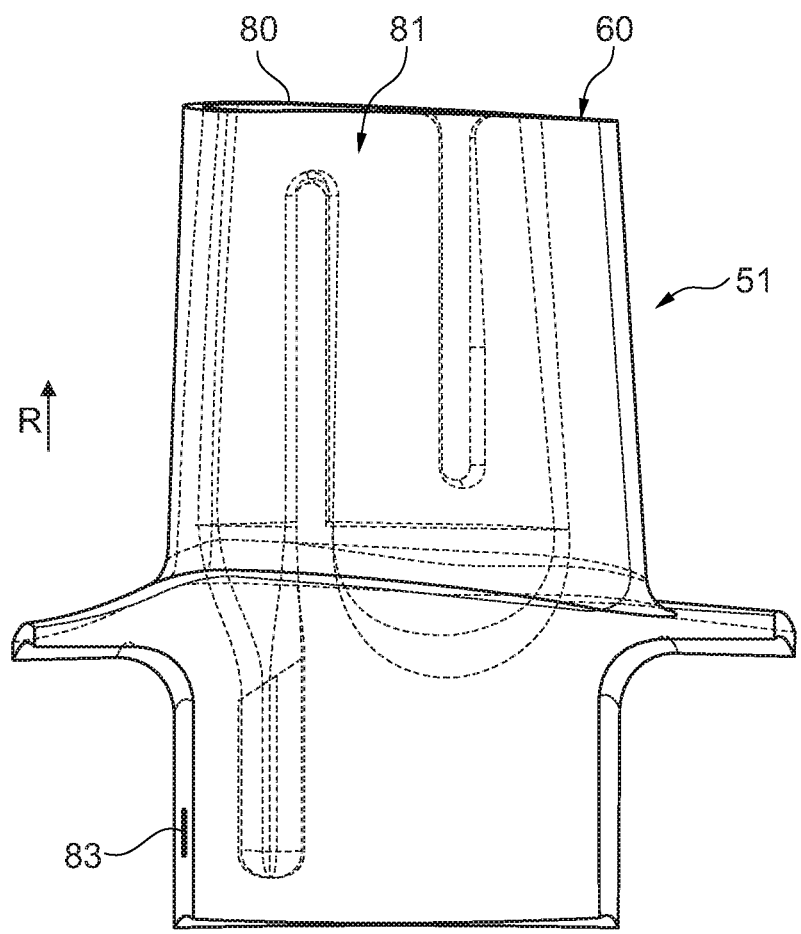
FIG. 8 an illustration of a first structural element (base element) of the embodiment from FIG. 7.
Figure 9:
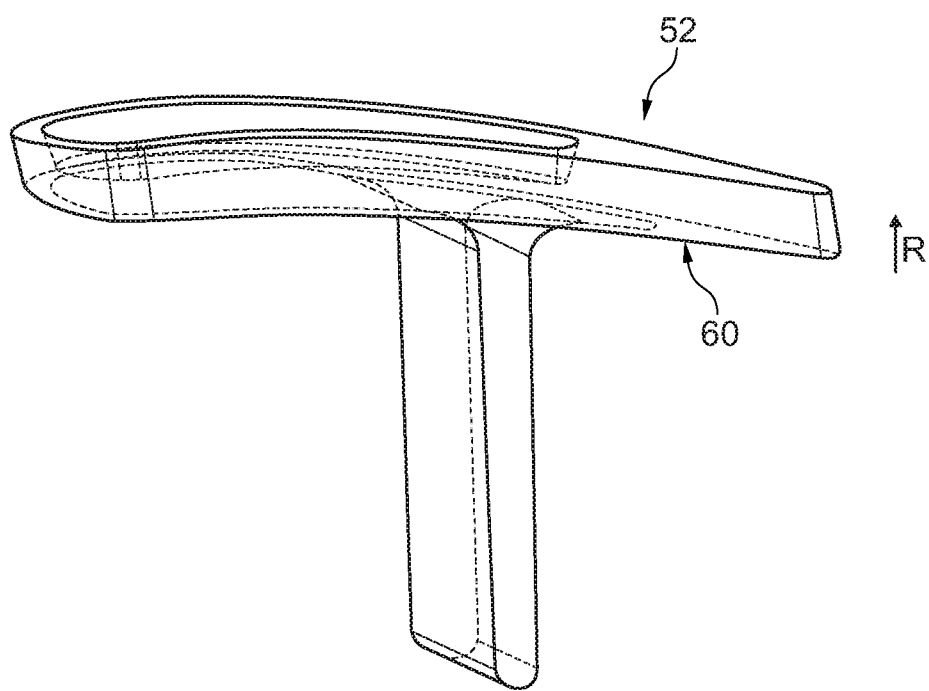
FIG. 9 an illustration of a second structural element (tip element) of the embodiment from FIG. 7.

The first structural element 51 is here formed as a base element (see FIG. 8), at the top of which the second structural element 52 may be arranged as a tip element (FIG. 9). As before, both structural elements 51, 52 may be produced as green parts in a metal injection molding process and then connected by sintering.

Figure 7A:
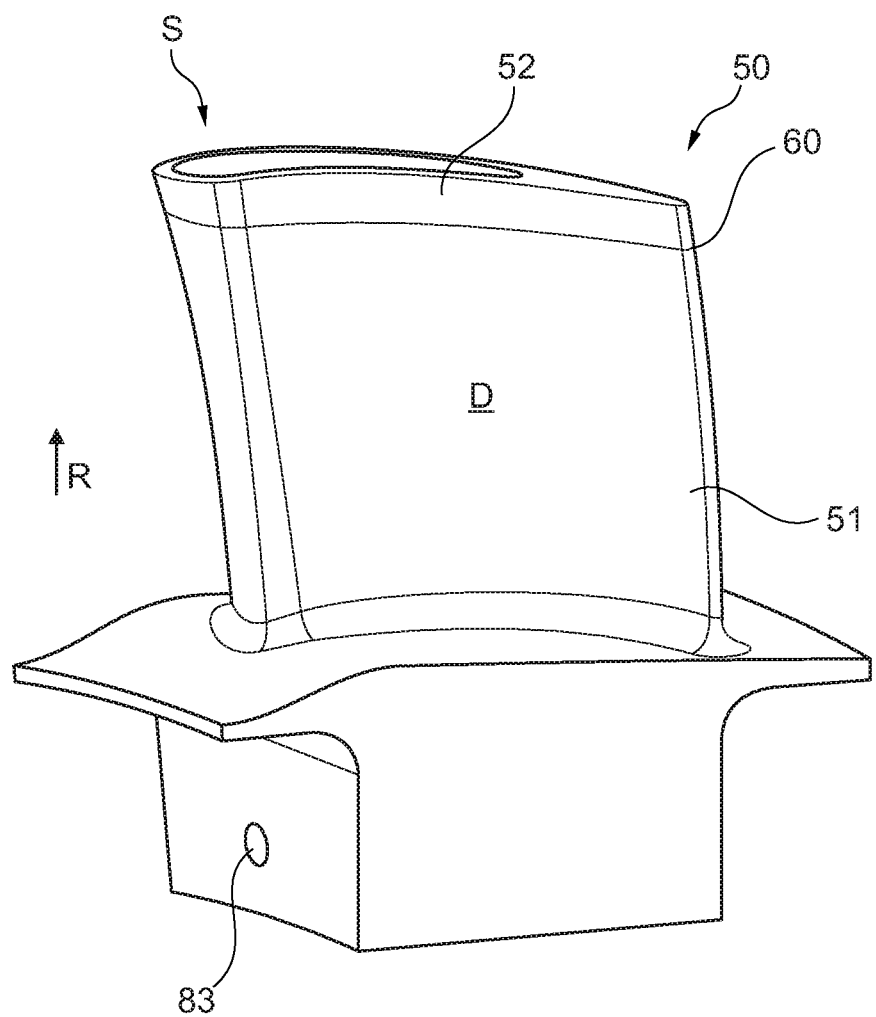
FIG. 7a, b a further embodiment of a blade component with two structural elements, with two illustrations.

FIG. 7a shows a perspective view of such a blade component 50, wherein the pressure side D lies at the front. The suction side S lies on the far side. As in the embodiment in FIGS. 2 to 5, an inlet opening 83 for the cooling medium (e.g. cooling air) is arranged in the base.

The connecting surface 60 is arranged in the upper tenth of the total height of the blade component 50. The connecting surface 60 lies in a face 70 (not shown here) which is curved slightly downward towards the base, wherein the general orientation of the face 70 is perpendicular to the radial extent R.

Figure 7B:
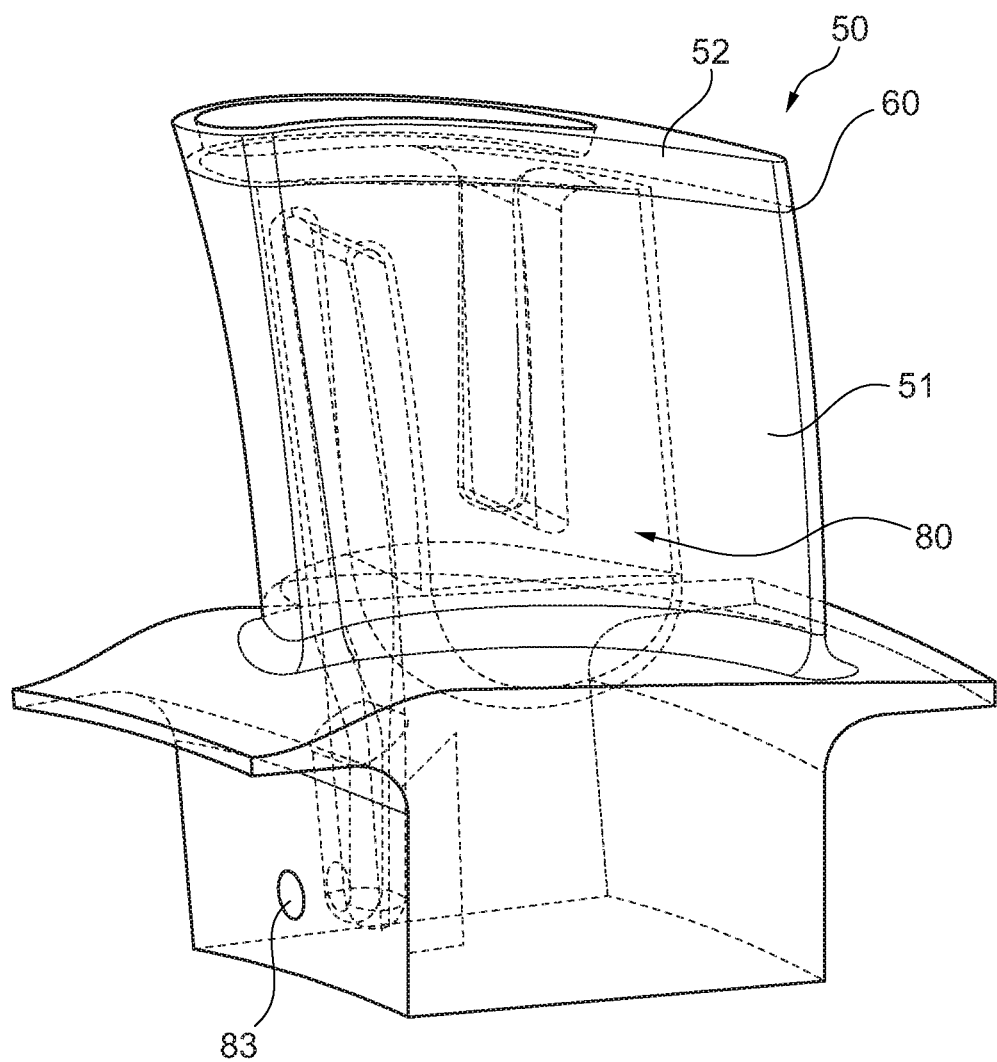

FIG. 7b shows the same blade component 50, wherein a means 80 for internal cooling of the blade component is arranged in the interior (and depicted in dotted lines), in the structural elements 51, 52 themselves. The structural elements 51, 52 are here configured such that a snaking cooling duct 82 is formed during assembly.

FIG. 8 shows the base structural element 51 with the cooling duct 81 arranged in the interior. Here, the cooling air K enters the structural element 51 through the inlet opening 83 and is then initially conducted upward in the cooling duct 80. The cooling duct 80 then bends towards the rear at the upper end (viewed in the radial direction R). The cooling duct 80 then leads down again and then up again, giving a sinuous arrangement with a triple-pass cooling system 80.

Figure 10:
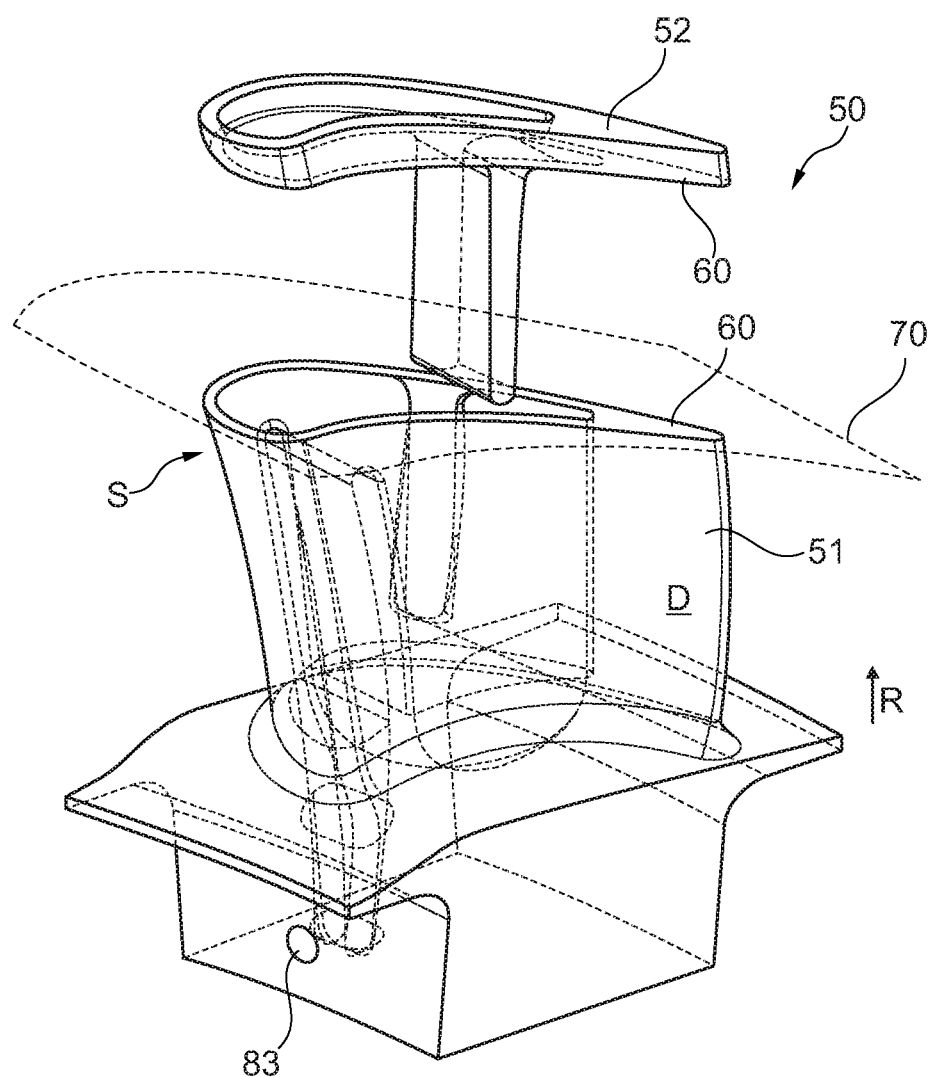
FIG. 10 an illustration of both structural elements of the embodiment from FIG. 7 during assembly.

FIG. 9 shows the tip structural element 52 which can be connected to the base structural element 51, as illustrated in FIG. 10.

With this design, a plurality of different core arrangements can be implemented, starting from simple straight passages oriented radially outward, through to combinations of multi-pass cores with snaking curves and straight passages.

So far, in the manufacture of the embodiments of the blade component 50, only the manufacture of the blade itself from two structural elements 51, 52 has been described.

It is however also possible to connect the blade component 50 to a ring component or a disc component 55, in particular by sintering, into a compressor or turbine stage.

It is conceivable that a ring component 55 (see FIG. 11) with blade components 50 can be produced in a metal injection molding process. The blade components 50 (manufactured as described above) may be arranged in a ring, leaving a gap between the individual blade components 50 in each case. These gaps are then filled with metal powder in order to allow debinding and sintering of the blades assembled into the blade ring 55 during a metal injection molding process.

Figure 12:
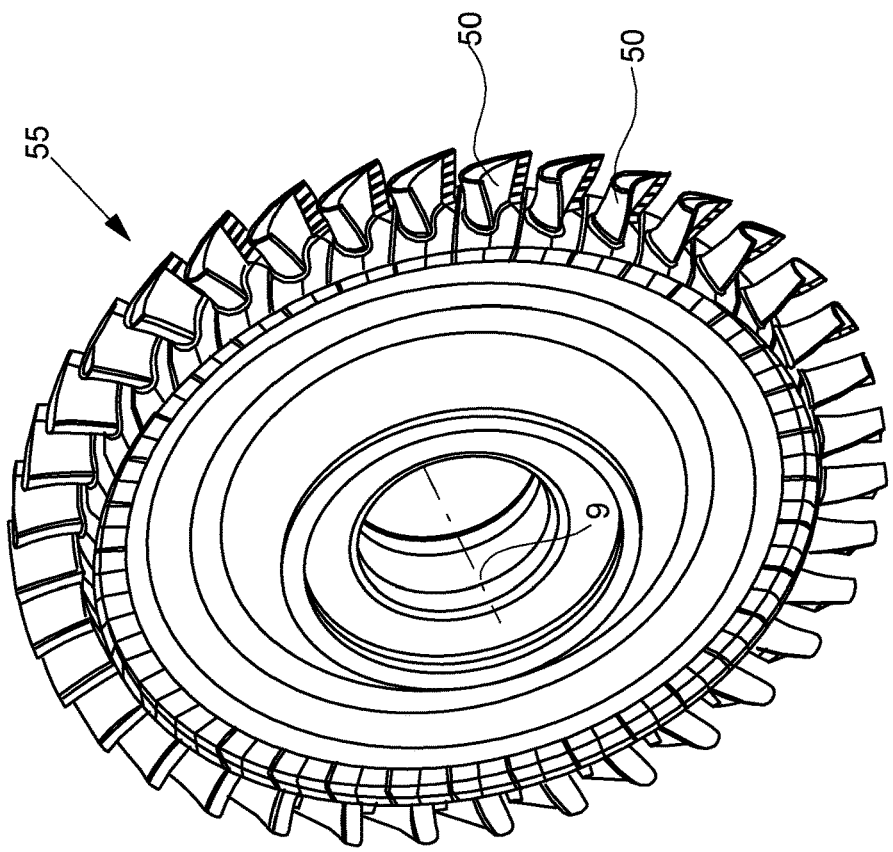
FIG. 12 an illustration of a disc component formed from blade components.

FIG. 12 shows a disc component 55 which can be produced from the blade components 50 in a similar fashion.

In this way, compressor or turbine stages can be assembled from individual green parts which can be formed individually. Thus for example the basic structure of the disc component 55 is usually simpler than that of blades with complex curvature, which may also have an inner structure with cooling ducts 65 of complex form. Thus each of the parts 51, 52, 55 may be produced economically in order then to form a uniform part, a blink, during sintering.

It will be understood that the solution is not limited to the embodiments above-described and various modifications and improvements can be made without departing from the concepts described herein. Any of the features may be used separately or in combination with any other features, unless they are mutually exclusive, and the disclosure extends to and includes all combinations and subcombinations of one or more features which are described here.

LIST OF REFERENCE SIGNS

9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
30 Gear mechanism, planetary gear
50 Blade component
51 First structural element of blade component
52 Second structural element of blade component
53 Contour in interior of blade component
55 Ring component, disc component
60 Connecting surface
70 Free-form spatial face
71 Plane
80 Means for internal cooling of blade component, cooling insert
81 Impingement cooling openings for cooling medium (cooling air) in cooling insert
82 Cooling duct
83 Inlet opening for cooling medium
84 Outlet opening for cooling medium
A Core air flow
B Bypass air flow
D Pressure side of blade component
F Contact flow direction
K Cooling air flow
R Radial extent of blade component
S Suction side of blade component

The invention claimed is:

1. A method for manufacturing a blade component, comprising:
  a) providing at least two structural components, a disc component and a cooling insert, wherein the at least two structural components define an exterior form of the blade component
  b) connecting the at least two structural components and the disc component
  c) arranging the cooling insert in at least one of the at least two structural components
  d) connecting the at least two structural components to the cooling insert, such that the cooling insert is inside the blade component;
  e) wherein, the at least two structural components with the cooling insert inside the blade component are configured to cause, during operation, cooling air flowing into the cooling insert to be guided in targeted fashion via impingement cooling openings onto an interior of the blade component, as impingement flow cooling, and
  f) wherein, at least one chosen from the at least two structural components and the cooling insert are configured as unsintered green parts of a metal injection molding process and the connecting of the at least two structural components to the cooling insert is performed by sintering.

2. The method according to claim 1, wherein the at least two structural components are unsintered green parts and are connected to the disc component by the sintering.

3. The method according to claim 1 and further comprising providing that the blade component is installed in a gas turbine.

4. The method according to claim 3, and further comprising providing that the gas turbine is a stationary gas turbine, a gas turbine for a ship, or a gas turbine engine for an aircraft.

5. The method according to claim 1, wherein at least one of the at least two structural components has on an interior surface a contour which, when assembled, forms part of a cooling duct.

6. The method according to claim 5, wherein when assembled, the contour protrudes from the at least one of the at least two structural components into the interior of the blade component.

7. The method according to claim 1, wherein when assembled, a cooling duct is formed between the at least two structural components and the cooling insert.

8. The method according to claim 1, wherein the at least two structural components are connected via a connecting surface, wherein the connecting surface is arranged in a free-form face or a plane.

9. The method according to claim 1, wherein the free-form face or the plane is arranged substantially perpendicularly to a radial extent of the blade component.

10. The method according to claim 1, wherein the at least two structural components and the cooling insert are made of different materials or comprise different materials.

11. The method according to claim 1, wherein one of the at least two structural components comprises the suction side or the pressure side of the blade component.

12. The method according to claim 1, wherein the disc component is an unsintered green component of a compressor or rotor stage and the connecting of the at least two structural components and the disc component is performed by the sintering.

13. The method according to claim 1, and further comprising arranging a connector for the disc component on at least one of the at least two structural components.

* * * * *